Aug. 29, 1950     A. H. P. KENT     2,520,413
HAND TOOL FOR GARDENING
Filed July 21, 1947
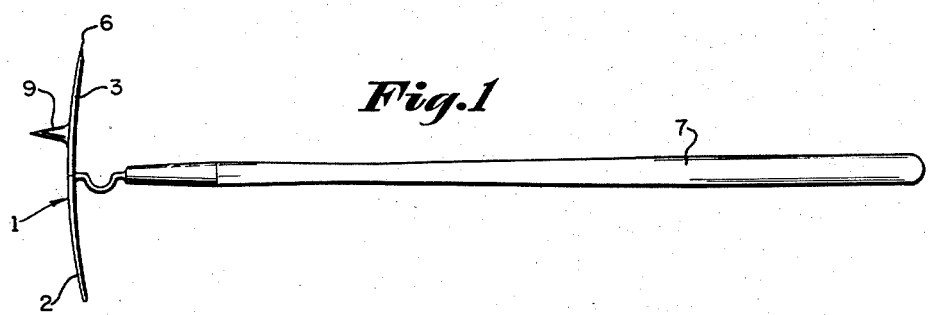
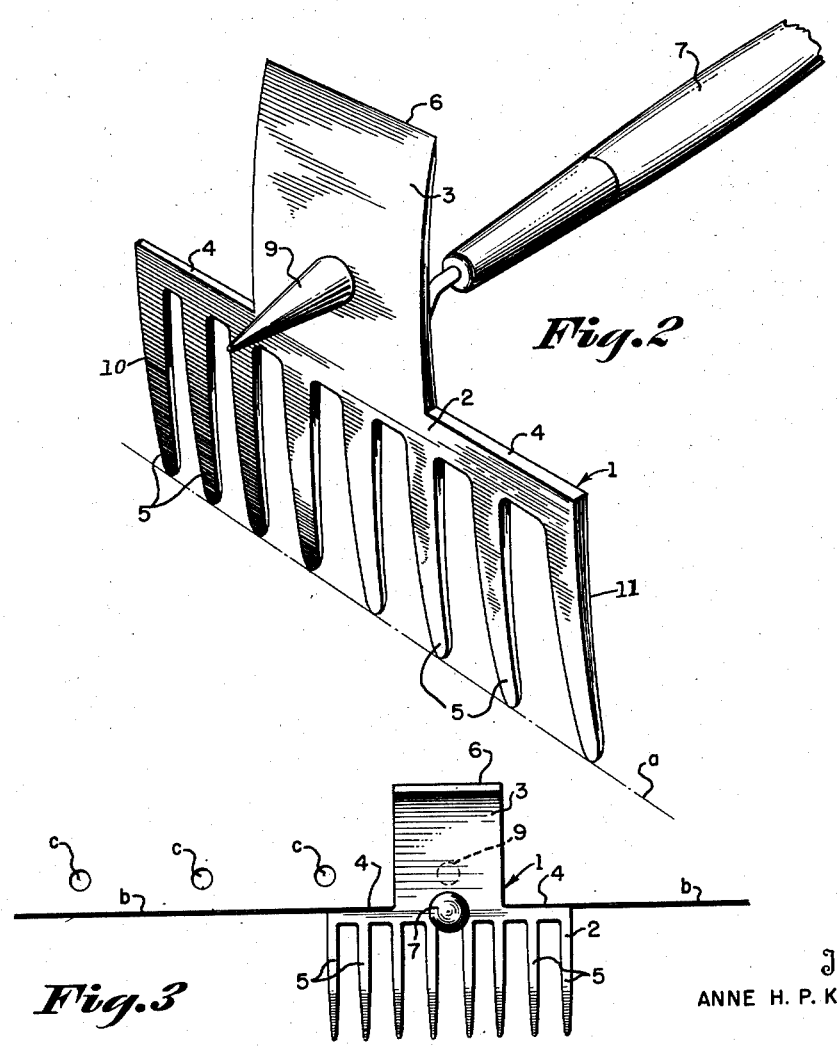
Inventor
ANNE H. P. KENT
By Mason, Fenwick & Lawrence
Attorneys Patented Aug. 29, 1950

2,520,413

UNITED STATES PATENT OFFICE 2,520,413

HAND TOOL FOR GARDENING

Anne H. P. Kent, Washington, D. C.

Application July 21, 1947, Serial No. 762,292

1 Claim. (Cl. 56—400.06)

This invention relates to a hand tool for gardening. It combines the functions of a hoe, rake and marker for making spaced holes in a row for seeds or seedlings.

One of the objects of the invention is to provide a tool of the class described comprising a short rake having a narrow hoe blade projecting from the back to the rake equidistant from the ends thereof, the perpendicular distance from the edge of the hoe blade to the toothed edge of the rake being equal to the length of the rake, and the handle being secured perpendicular thereto substantially at the center of a circle which is tangent to the edge of the hoe blade and the ends of the rake, whereby the handle may be rotated about its axis to bring either the rake or hoe blade in the working position with respect to the ground.

Another object of the invention is to provide a hand tool as described, having a straight backed rake and a spur or point projecting from the face of the tool opposite to the handle, offset from the back of the rake in the direction of the hoe blade, so that the back of the rake may be used as a guide in coincidence with a cord stretched lengthwise of the row, and planting holes made by the spur which becomes exposed from beneath the tool as the latter is moved lengthwise of the row, so that the ends of the rake and the intermediate teeth thereof may be used as a scale to which the hole last made may be referred as an index for the spacing of a succession of planting holes.

Other objects of the invention will appear as the following description of a preferred and practical embodiment thereof proceeds.

In the drawing which accompanies and forms a part of the specification, wherein the same reference characters have been employed to denote identical elements:

Figure 1 is a side elevation of a tool embodying the principles of the invention;

Figure 2 is a perspective view, part of the handle being not shown;

Figure 3 is a top plan view illustrating the use of the tool as a planting hole spacer.

Referring now in detail to the drawings, the numeral 1 represents, as a whole, the head of the tool which is of metal and includes a rake 2 and hoe blade 3, preferably integral, the rake having a straight back 4, from the middle portion of which the hoe blade 3 extends contra to the direction of the rake teeth 5. The rake 2 is of relatively short length and the hoe blade 3 is narrower than the length of the rake and located equidistantly from the ends 10 and 11 of the rake. The hoe blade is preferably of such length that the distance from the toothline $a$ of the rake to the cutting edge 6 of the hoe blade is substantially equal to the length of the rake.

The rake and hoe blade are slightly uniformly curved, as shown, so that the head 1 is concave toward the handle 7, the latter being preferably straight and fixed to the head 1 at a point midway between the edge of the hoe blade and toothline $a$ of the rake, and substantially perpendicular to the plane of the head 1.

In the use of the implement it may be desired in working close to a plant first to cut a weed with the hoe blade, then to rake it out. After the weed has been cut, it is merely necessary to rotate the handle about its axis in order to substitute the rake for the hoe blade at the working point, the one following within the circular path of movement of the other, thus permitting cultivation in restricted places which could not otherwise be reached without damage to the adjacent plants. One of the advantages of the combined implement is that it obviates the need of putting down a hoe and picking up a rake.

The hoe blade 3 has a spur or dibble 9, fixed thereto, projecting substantially perpendicular therefrom on the convex side of the head, and offset from the back of the rake. One use of the spur is to hold the implement upright in the soil when it is not being used. It is simply thrust vertically into the ground, the implement being supported upon the adjacent surfaces of the rake and hoe blade and prevented from toppling by the engagement of the spur with the ground.

The most important function of the spur is its use in combination with the rake for making a series of equally spaced holes along the row for the planting of seeds or seedlings. In carrying out this operation a cord $b$ is first stretched lengthwise of the row. The straight back 4 of the rake is then placed coincident to the cord, the tool being held vertically. The spur is then pushed into the ground, forming a planting hole $c$. This hole is not immediately visible, since the spur is underneath the hoe blade, but when the implement is moved along the row with the back of the rake coinciding with the cord, the hole, due to the offset position of the spur, becomes exposed adjacent the back of the rake. The ends and the intermediate parallel teeth 5 of the rake form a convenient scale to which to refer the hole in determining the uniform spacing of successive holes. For instance, if the distance from the middle of the rake to one end is four inches, and the end of the rake is lined up with the hole last made, successive holes will be four inches apart. For a closer spacing, the hole last made may be lined up with one of the intermediate teeth.

While I have in the above description described what I believe to be a preferred and practical embodiment of the invention, it will be understood by those skilled in the art that the details of construction and arrangement of parts, as shown, are by way of illustration and not to be construed as limiting the scope of the invention.

What I claim as my invention is:

Hand tool for gardening comprising a flat head including an elongated rectangular portion having one of its longer edges serrated forming equally spaced parallel prongs, and having its opposite longer edge formed as a straight edge, and including an integral portion of less width than the length of said straight edge extended from the latter equidistant from the ends thereof, a handle secured to said head substantially at the middle point thereof, and a pointed dibble projecting from said extended portion on the side of said head opposite the handle, offset from the line of said straight edge.

ANNE H. P. KENT.

REFERENCES CITED

The following references are of record in the file of this patent:

UNITED STATES PATENTS

| Number | Name | Date |
|---|---|---|
| 332,350 | Kretsinger | Dec. 15, 1885 |
| 538,146 | Bailey | Apr. 23, 1895 |
| 2,201,436 | Jones | May 21, 1940 |